J. J. QUERTINMONT.
APPARATUS FOR MAKING WIRE GLASS.
APPLICATION FILED FEB. 1, 1908.
1,119,535.
Patented Dec. 1, 1914.
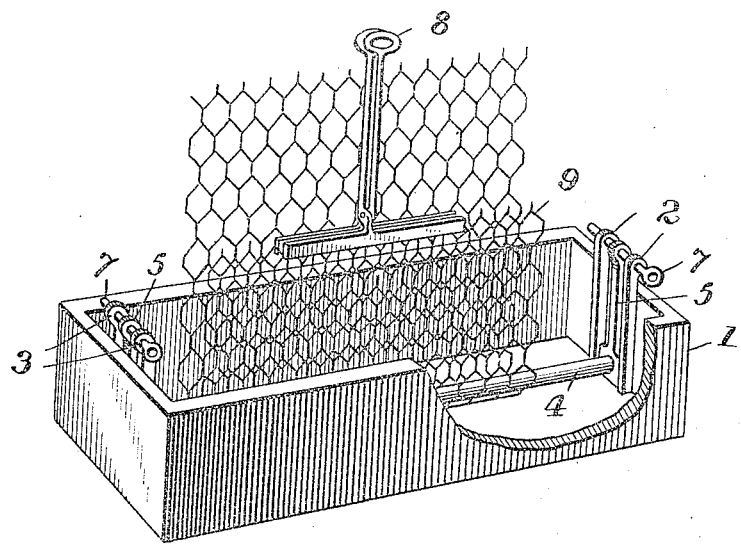
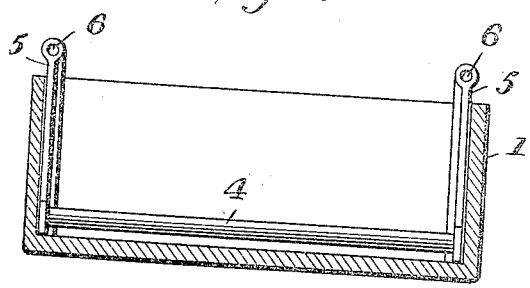
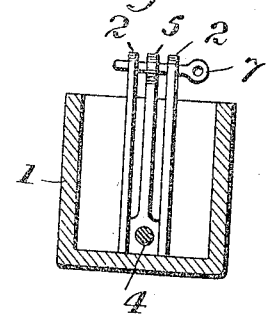
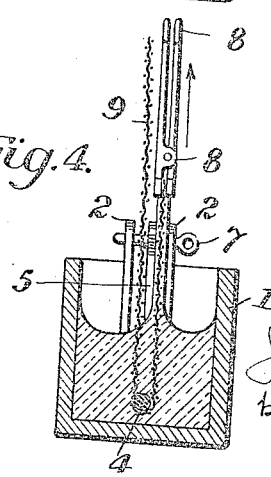
Inventor
Jules J. Quertinmont
by W. Schornborn
Attorney

UNITED STATES PATENT OFFICE.

JULES J. QUERTINMONT, OF POINT MARION, PENNSYLVANIA.

APPARATUS FOR MAKING WIRE-GLASS.

1,119,535.  Specification of Letters Patent.  Patented Dec. 1, 1914.

Application filed February 1, 1908. Serial No. 413,851.

*To all whom it may concern:*

Be it known that I, JULES J. QUERTINMONT, a citizen of the United States, residing at Point Marion, in the county of Fayette and State of Pennsylvania, have invented certain new and useful Improvements in Apparatus for Making Wire-Glass, of which the following is a specification.

My invention relates to the manufacture of glass, and has particularly to do with the production of plates or sheets of glass reinforced with an embedded metallic mesh, the same being commonly known in the art as "wire glass."

The novel features of the invention will be more fully understood from the following detailed description, taken in connection with the accompanying drawings.

Referring to said drawings, wherein like reference characters are used to designate the same parts, Figure 1 is a perspective view of a portion of my improved apparatus and illustrating a step in the novel process; Fig. 2 is a central longitudinal vertical section of the apparatus shown in Fig. 1; Fig. 3 is a transverse vertical section of the same apparatus; Fig. 4 is a similar view showing the apparatus with glass therein in process of manipulation.

Referring to the drawings, 1 is a long trough-like holder to receive the molten glass; this holder may if desired be arranged as a ladle and dipped into the supply reservoir, or it may be filled by a separate ladle. 2, 3 are pairs of vertical guides placed apart a short distance at the respective ends of the holder and having eyes at the top thereof as shown.

4 is a rod or bar preferably circular and extending from end to end of the holder 1. Said rod is guided for vertical movement in the holder between the guides 2, 3 and for this purpose slides 5, 5 are engaged with the ends of rod 4; such engagement may be a loose one so that rod 4 may turn as a roller in said slides. The slides 5, 5 for at least a portion of their length fill the space between guides 2 and 3 so as to be properly guided thereby, and they have upstanding portions provided with eyes 6 as shown, said eyes being arranged to register with the eyes in guides 2, 3 when the rod 4 is in its lowermost position. When in such position pins or bolts 7 may be entered through said registering eyes to securely hold the rod 4 in its lowermost position.

I will now proceed to describe my novel process so far as it has to do with the above described apparatus. The holder 1 having been filled with molten glass by dipping the same into a supply reservoir or otherwise, the rod 4 has an end 9 of the wire mesh wrapped underneath the same and extending upward as shown in Fig. 1. The rod with its slides 5, 5 is then forced down to the bottom of the holder and retained in such position by passing the pins 7 through the registering eyes as described. The glass having been allowed to cool until its fluidity has been diminished to the necessary extent, depending on the thickness of glass plate desired, the extending end 9 of the wire mesh is grasped by suitable tongs 8 and drawn outward. It will be obvious that by reason of its viscidity portions of the glass will adhere to the wire mesh upon each side and such portions will cohere together forming a homogeneous plate, the thickness of which may be determined by the degree of heat and hence fluidity of the molten mass, and also to a large extent by proper manipulation.

It will be apparent that plates of wire glass of any ordinary size can be rapidly and cheaply produced by the above process, and if a high degree of finish or polish is not desired no further treatment of the sheets of glass is necessary, but they may be allowed to cool and be cut up into the desired sizes.

Having now fully described my invention, what I claim as new and desire to secure by Letters Patent is as follows:—

1. An apparatus for making wire glass comprising an elongated holder, a removable roller for guiding a wire mesh in passage through said holder, and means to normally hold said roller guiding means adjacent the bottom of said holder.

2. An apparatus for making wire glass comprising a holder, guides oppositely disposed therein, slides for engagement with said guides, and a roller rod for guiding a wire mesh near the bottom of the holder supported by said slides.

3. An apparatus for making wire glass comprising a holder, guides oppositely disposed therein, slides for engagement with said guides, a roller rod supported by said slides, and means for normally holding said rod adjacent the bottom of said holder.

In testimony whereof I affix my signature in presence of two witnesses.

JULES J. QUERTINMONT.

Witnesses:
W. T. DEVLIN,
FLOUSE DULIERE.